(12) United States Patent
Beaton et al.

(10) Patent No.: US 9,094,638 B2
(45) Date of Patent: Jul. 28, 2015

(54) PORTABLE CONTEXTUAL MENU FOR TRIPLE PLAY SERVICE

(75) Inventors: Robert J. Beaton, Apohaqui (CA); Jeff Furlong, Grand Bay-Westfield (CA); Alistair John Parker, Edmonton (CA)

(73) Assignee: Alcatel Lucent, Boulogne-Billancourt (FR)

( * ) Notice: Subject to any disclaimer, the term of this patent is extended or adjusted under 35 U.S.C. 154(b) by 2134 days.

(21) Appl. No.: 11/418,134

(22) Filed: May 5, 2006

(65) Prior Publication Data

US 2007/0260708 A1 Nov. 8, 2007

(51) Int. Cl.

| | |
|---|---|
| G06F 15/16 | (2006.01) |
| H04W 24/00 | (2009.01) |
| H04N 7/16 | (2011.01) |
| H04N 5/445 | (2011.01) |
| H04N 21/258 | (2011.01) |
| H04N 21/262 | (2011.01) |
| H04N 21/2665 | (2011.01) |
| H04N 21/41 | (2011.01) |
| H04N 21/414 | (2011.01) |
| H04N 21/422 | (2011.01) |
| H04N 21/4227 | (2011.01) |
| H04N 21/45 | (2011.01) |
| H04N 21/462 | (2011.01) |
| H04N 21/478 | (2011.01) |
| H04N 21/643 | (2011.01) |
| H04N 21/658 | (2011.01) |

(52) U.S. Cl.
CPC ......... *H04N 5/445* (2013.01); *H04N 21/25841* (2013.01); *H04N 21/25891* (2013.01); *H04N 21/2665* (2013.01); *H04N 21/26291* (2013.01); *H04N 21/4131* (2013.01); *H04N 21/41407* (2013.01); *H04N 21/4227* (2013.01); *H04N 21/42202* (2013.01); *H04N 21/4524* (2013.01); *H04N 21/4532* (2013.01); *H04N 21/4622* (2013.01); *H04N 21/478* (2013.01); *H04N 21/64322* (2013.01); *H04N 21/6582* (2013.01)

(58) Field of Classification Search
USPC .......................................................... 709/203
See application file for complete search history.

(56) References Cited

U.S. PATENT DOCUMENTS

| | | | |
|---|---|---|---|
| 2002/0133545 A1* | 9/2002 | Fano et al. ..................... 709/203 |
| 2003/0220835 A1 | 11/2003 | Barnes | |
| 2004/0015405 A1* | 1/2004 | Cloutier et al. ................. 705/26 |
| 2004/0098360 A1 | 5/2004 | Witwer et al. | |
| 2004/0168131 A1* | 8/2004 | Blumberg ..................... 715/534 |
| 2005/0289623 A1* | 12/2005 | Midani et al. ................. 725/100 |
| 2006/0247855 A1* | 11/2006 | de Silva et al. ............... 701/212 |

* cited by examiner

*Primary Examiner* — Angela Nguyen
(74) *Attorney, Agent, or Firm* — Kramer + Amado, P.C.

(57) ABSTRACT

A method for accessing triple play services provided through a server over a network to a portable device, the method comprising: receiving a signal from a user defining respective preference levels for the triple play services; determining a location for the portable device; determining which of the triple play services are available at the location; composing a list of available services at the location, the available services in the list being ordered in accordance with the respective preference levels; and, displaying the list on a display screen of the portable device, whereby the user may access the available services by selecting from the list.

20 Claims, 4 Drawing Sheets

PORTABLE CONTEXTUAL MENU FOR TRIPLE PLAY SERVICE

FIELD OF THE INVENTION

This invention relates to triple play service, and more specifically, to a portable contextual menu for accessing triple play services.

BACKGROUND OF THE INVENTION

In telecommunications, the term "triple play service" or "triple play" refers to the provision of three services, namely, high-speed Internet, television (i.e., video-on-demand or regular broadcasts), and telephone service, over a single broadband connection by a service provider ("SP"). Triple play service is offered by cable television operators as well as by telecommunication operators. For a telephone local exchange carrier ("LEC"), triple play service is delivered using a combination of optical fiber and digital subscriber line ("DSL") technologies to their residential customer subscriber base. This configuration uses fiber communications to reach distant locations and uses DSL over an existing plain old telephone serve ("POTS") twisted pair cable as last mile access to the subscriber's home. Cable television operators use a similar architecture called hybrid fibre coaxial ("HFC") to provide subscriber homes with broadband, but use the available coaxial cable rather than a twisted pair for the last mile transmission standard. Subscriber homes can be in a residential environment, multi-dwelling units, or even in business offices.

Using DSL over twisted pair, television content is delivered using Internet Protocol ("IP") television ("IPTV") where the content is streamed to the subscriber in a MPEG-2 ("Moving Pictures Expert Group"-2) transport format. With IPTV, digital television service is delivered to subscribing consumers using IP over a broadband connection. On an HFC network, television may be a mixture of analog and digital television signals. A set-top-box ("STB") is used at the subscriber's home to allow the subscriber to control viewing and order new video services such as movies on demand. Internet service is delivered via asynchronous transfer mode ("ATM") or data over cable service interface specification ("DOCSIS"), typically provided as a 10BASE-T (i.e., 10 Mbit/s baseband over twisted pair) Ethernet port to the subscriber. Voice can be delivered using a traditional POTS interface as part of the legacy telephone network or can be delivered using voice over IP ("VoIP"). In a HFC network, voice is delivered using VoIP.

Some service providers ("SPs") also provide Ethernet-to-the-home and fiber-to-the-home networks which support triple play service and bypass the disadvantages of adapting broadband transmission to legacy networks. This is particularly common in green field developments where capital expenditures are reduced by deploying one network to deliver all services.

Triple play has led to the term "quadruple play" where wireless communications is introduced as another media to deliver video, Internet, and voice content. Advances in both code division multiple access ("CDMA") and global system for mobile communications ("GSM") standards, utilizing third generation ("3G"), fourth generation ("4G"), or universal mobile telecommunications service ("UMTS") mobile telephone technologies, allow service operators to provide quadruple play services. The grouping together of services (such as triple or quadruple play) is referred to as "multi-play".

It has been said that the main challenges in offering triple play relate to backend processes and subscriber support. With respect to technical challenges, voice, video and high speed data all have different characteristics and place different burdens on the network that provides access to these services. For example, voice services are greatly affected by jitter, whereas packet loss or packet reordering has a greater affect on video and data services. Using a shared network resource such as cable or DSL requires that the network equipment used employs quality of service mechanisms.

With respect to subscriber support, subscribers are beginning to demand access to their triple play services through whatever device they may be using at a particular location. The services that a subscriber may wish to access at a first location may be differ from the services that the subscriber may wish to access at a second location. In particular, the services available at the first location may differ from those available at the second location. For example, a television equipped with a set-top box may be available at the first location while a cellular telephone may be the only available device at the second location.

With respect to customized user interfaces in general, United States Patent Application Publication No. 2004/0098360 by Witwer, et al., ("Witwer") provides a user-created life portal for viewing and accessing content on the Internet. The platform, referred to as a life portal, is configured by the user to display only content that is of interest to the user, thereby reflecting the personality and life of the user. The content displayed in a life portal is scraped from web sites and is not limited to sites licensed or maintained by the life portal service provider. The content is displayed as a view or a magazine. Views and magazines (content) are stored in life pages. A view is content that is contained in a portlet and is retrieved from a single web site. A magazine is a collection of content, such as article headlines and links, on a particular topic from one or more web sites. All content in a life portal is specifically tailored to meet the targeted interests and preferences of the user and is designed to exclude content not of direct interest to the user. Thus, while systems such as that provided by Witwer may provide interface content that is based on user interests and preferences, they do not provide an adequate user interface for accessing triple play services that may be location and/or technology dependent.

A need therefore exists for an improved user interface for accessing triple play services. Accordingly, a solution that addresses, at least in part, the above and other shortcomings is desired.

SUMMARY OF THE INVENTION

According to one aspect of the invention, there is provided a method for accessing triple play services provided through a server over a network to a portable device, the method comprising: receiving a signal from a user defining respective preference levels for the triple play services; determining a location for the portable device; determining which of the triple play services are available at the location; composing a list of available services at the location, the available services in the list being ordered in accordance with the respective preference levels; and, displaying the list on a display screen of the portable device, whereby the user may access the available services by selecting from the list.

In the above method, the step of determining the location may further include receiving a signal indicative of the location. The signal indicative of the location may be received from a global positioning system ("GPS") receiver within the portable device. The step of determining which of the triple play services are available at the location may further include using the location to look up the available services from a table of locations and available services. The portable device may be at least one of a wireless device, a cellular telephone, a personal digital assistant, a portable computer, and a remote control unit. The location may be at least one of a home of the user, a workplace of the user, and a location of an automobile of the user. The method may further include the step of determining a next location for the portable device and updating the list in accordance with the next location when the portable device is within a predetermined distance from the next location. The triple play services may be one or more of a television service, a wired telephone service, a cellular telephone service, a wireless data service, a wireless email service, an Internet service, a short message service, a home security system service, a weather forecast service, and an on-line map service. The network may be an Internet Protocol ("IP") based network. And, the server may be an Internet server.

In accordance with further aspects of the present invention there is provided an apparatus such as a data processing system (e.g., a portable device), a method for adapting this system, as well as articles of manufacture such as a computer readable medium having program instructions recorded thereon for practicing the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Figure 1:
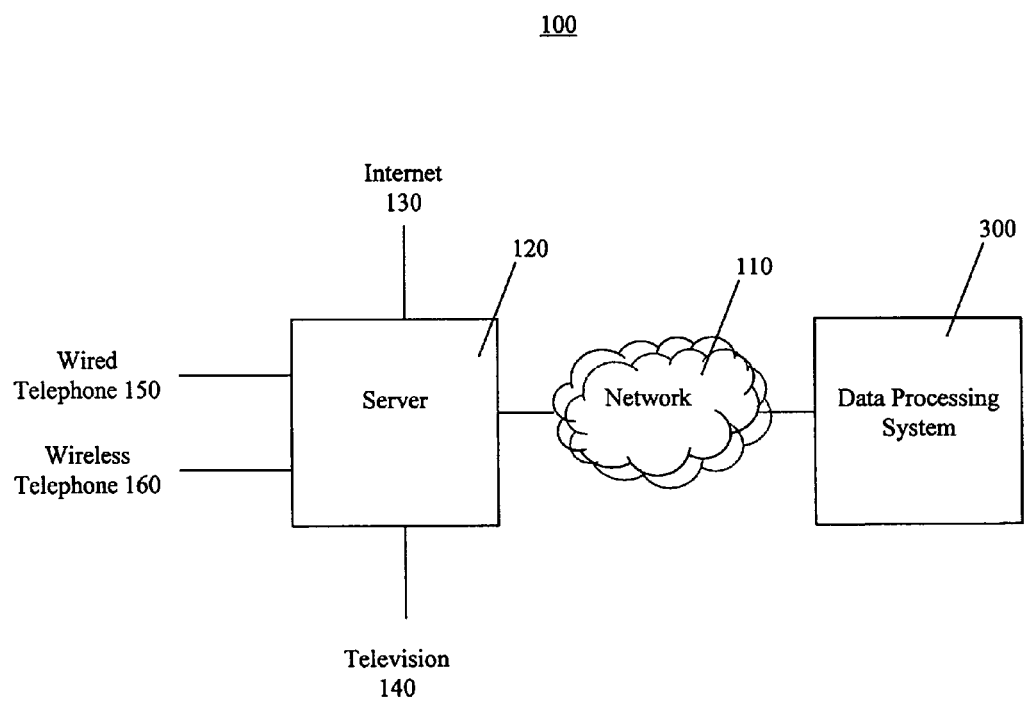
FIG. 1 is a block diagram illustrating a communications system for providing triple play service in accordance with an embodiment of the invention.

In the following description, details are set forth to provide an understanding of the invention. In some instances, certain software, circuits, structures and techniques have not been described or shown in detail in order not to obscure the invention. The term "data processing system" is used herein to refer to any machine for processing data, including the portable devices, personal computers ("PCs"), servers, handheld electronic devices, personal digital assistants ("PDAs"), wireless communication devices, cellular telephones, wireless email devices (e.g., the Blackberry™), instant messaging ("IM") devices, wired telephones, remote controls, and set-top boxes described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention.

The present invention provides a method and system for accessing triple play services with a portable contextual menu displayed on a portable device (e.g., laptop computer, PDA, wireless device, cellular telephone, remote control unit, etc.). In the following, the term "triple play" will refer to both "quadruple play" and "multi-play" services. In addition, the term "triple play" will refer to home monitoring and control services for alarm systems, heating/ventilating/air conditioning ("HVAC") systems, lighting systems, sprinkler systems, etc., that may be controlled from a PC at home or remotely through the Internet.

In particular, the present invention provides a method and system for presenting an organized contextual menu interface that regroups available options based on a subscriber's (i.e., a user's) preferences, location, and surrounding technology. The contextual menu is presented on the subscriber's portable device of choice. Rather than requiring a subscriber to recognize his or her location and surrounding technology, according to the present invention, the subscriber's portable device recognizes where it is located and/or the devices that surround it. In this way the subscriber's portable device "pulls" the required functionality to it and allows the subscriber to access and/or control the triple play devices and services that are available at the subscriber's present location. The portable device (e.g., laptop computer, PDA, wireless device, cellular telephone, remote control unit, etc.) presents a contextual menu or a "what's around me" menu to the subscriber that is continuously updated/sorted based on the subscriber's location and the available technology around the subscriber. The contextual menu allows for simple access of desired and available functionality and information based on user configured importance and relevancy. The present invention pertains to this contextual menu rather than to means for auto-discovering surrounding devices.

FIG. 1 is a block diagram illustrating a communications system 100 for providing triple play service in accordance with an embodiment of the invention. The communications system 100 includes a server 120 coupled to a data processing system 300 over a network 110. The server 120 may be maintained by a service provider ("SP") to provide triple play service to a subscriber or user of the data processing system 300. The server 120 accesses Internet 130, television 140, wired telephone 150, and wireless telephone or cellular 160 networks for providing corresponding services to the data processing system 300 in accordance with control messages received from the data processing system 300 over the network. The network 110 may be an IP based network (i.e., in the case of Internet, television, and wired telephone services) and/or a wireless network (i.e., in the case of wireless telephone or cellular services). The network 110 may include routers, switches, base stations, antennae, and other network devices (not shown).

Figure 2:
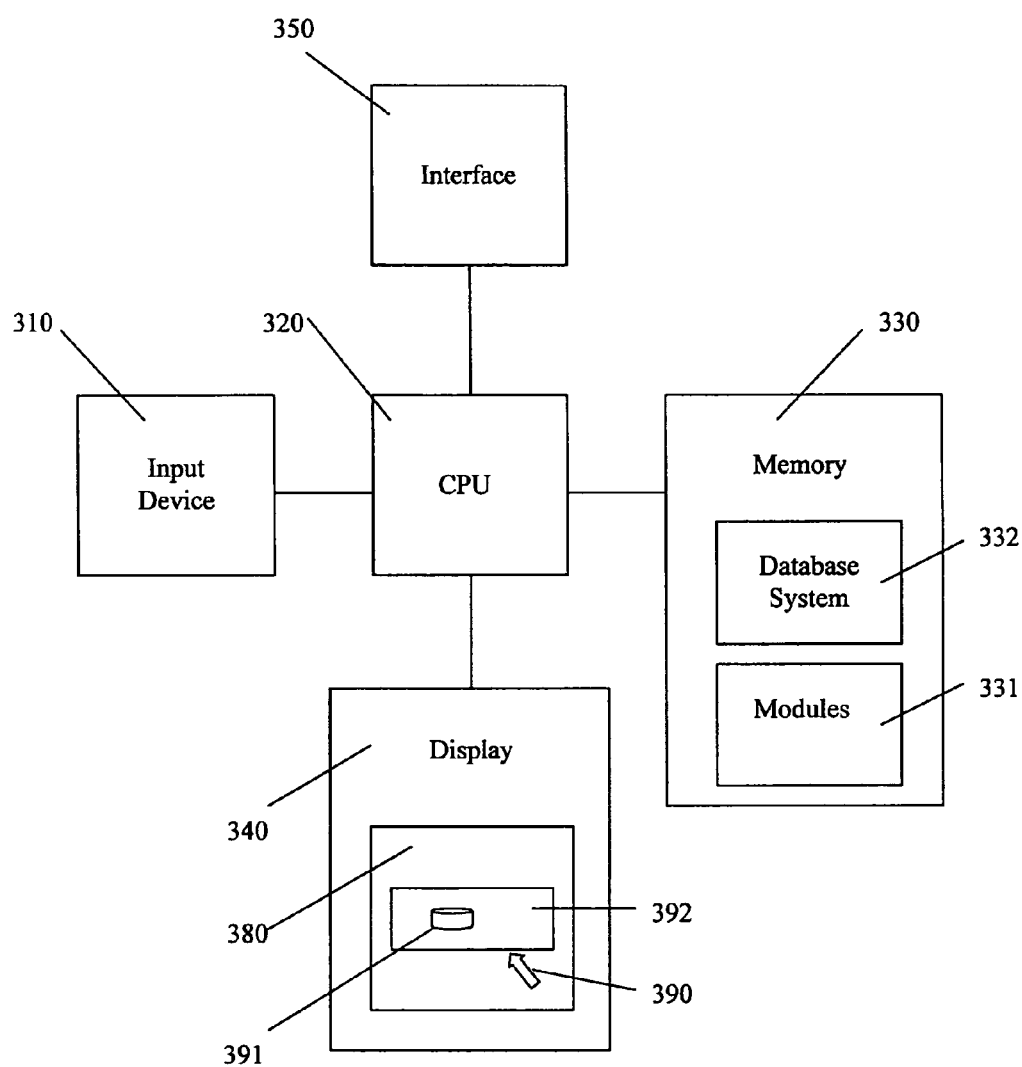
FIG. 2 is a block diagram illustrating a data processing system adapted to implement an embodiment of the invention.

FIG. 2 is a block diagram illustrating a data processing system 300 adapted to implement an embodiment of the invention. The data processing system 300 is suitable for operation as a portable device, personal computer ("PC"), server 120, handheld electronic device, personal digital assistant ("PDA"), wireless communication device, cellular telephone, wireless email device (e.g., a Blackberry™), instant messaging ("IM") device, wired telephone, remote control, and set-top box. The data processing system 300 includes a central processing unit ("CPU") 320, memory 330, and an interface device 350 and may optionally include an input device 310 and a display 340. The CPU 320 may include dedicated coprocessors and memory devices. The memory 330 may include RAM, ROM, disk devices, and databases. The interface device 350 may include a network connection (e.g., an IP based network connection and/or a wireless network connection). The input device 310 may include a keyboard, a mouse, a trackball, a remote control unit, or a similar device. And, the display 340 may include a computer screen, television screen, terminal device, or a hardcopy producing output device such as a printer or plotter. The data processing system 300 is adapted for communicating with other data processing systems (e.g., 120) over a network 110 via the interface device 350. The data processing system 300 may include a database system 332 for storing and accessing network topology and programming information. The database system 332 may include a database management system ("DBMS") and a database and may be stored in the memory 330 of the data processing system 300. The data processing system 300 has stored therein data representing sequences of instructions which when executed cause the method described herein to be performed. Of course, the data processing system 300 may contain additional software and hardware a description of which is not necessary for understanding the invention.

The CPU 320 of the system 300 is operatively coupled to memory 330 which stores an operating system (not shown) for general management of the system 300. The interface 350 may be used for communicating to external data processing systems (e.g., server 120 in FIG. 1, home alarm system, home HVAC system, etc.) through a network 110. The system 300 may include application server software (not shown) for developing and managing distributed applications. The CPU 320 of the system 300 is typically coupled to one or more devices 310 for receiving user commands or queries and for displaying the results of these commands or queries to the user on a display 340. As mentioned, the memory 330 may include a variety of storage devices including internal memory and external mass storage typically arranged in a hierarchy of storage as understood to those skilled in the art.

A user may interact with the data processing system 300 and its hardware and software modules 331 using a graphical user interface ("GUI") 380. The GUI 380 may be used for monitoring, managing, and accessing the data processing system 300. GUIs are supported by common operating systems and provide a display format which enables a user to choose commands, execute application programs, manage computer files, and perform other functions by selecting pictorial representations known as icons, or items from a menu through use of an input or pointing device such as a mouse 310. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input or pointing device (e.g., a mouse) 310 to position a pointer or cursor 390 over an object 391 and by "clicking" on the object 391.

Typically, a GUI based system presents application, system status, and other information to the user in "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

Thus, the data processing system 300 includes computer executable programmed instructions for directing the system 300 to implement the embodiments of the present invention. The programmed instructions may be embodied in one or more hardware modules or software modules 331 resident in the memory 330 of the data processing system 300. Alternatively, the programmed instructions may be embodied on a computer readable medium (such as a CD disk or floppy disk) which may be used for transporting the programmed instructions to the memory 330 of the data processing system 300. Alternatively, the programmed instructions may be embedded in a computer-readable signal or signal-bearing medium that is uploaded to a network by a vendor or supplier of the programmed instructions, and this signal or signal-bearing medium may be downloaded through an interface (e.g., 350) to the data processing system 300 from the network by end users or potential buyers.

Figure 3:
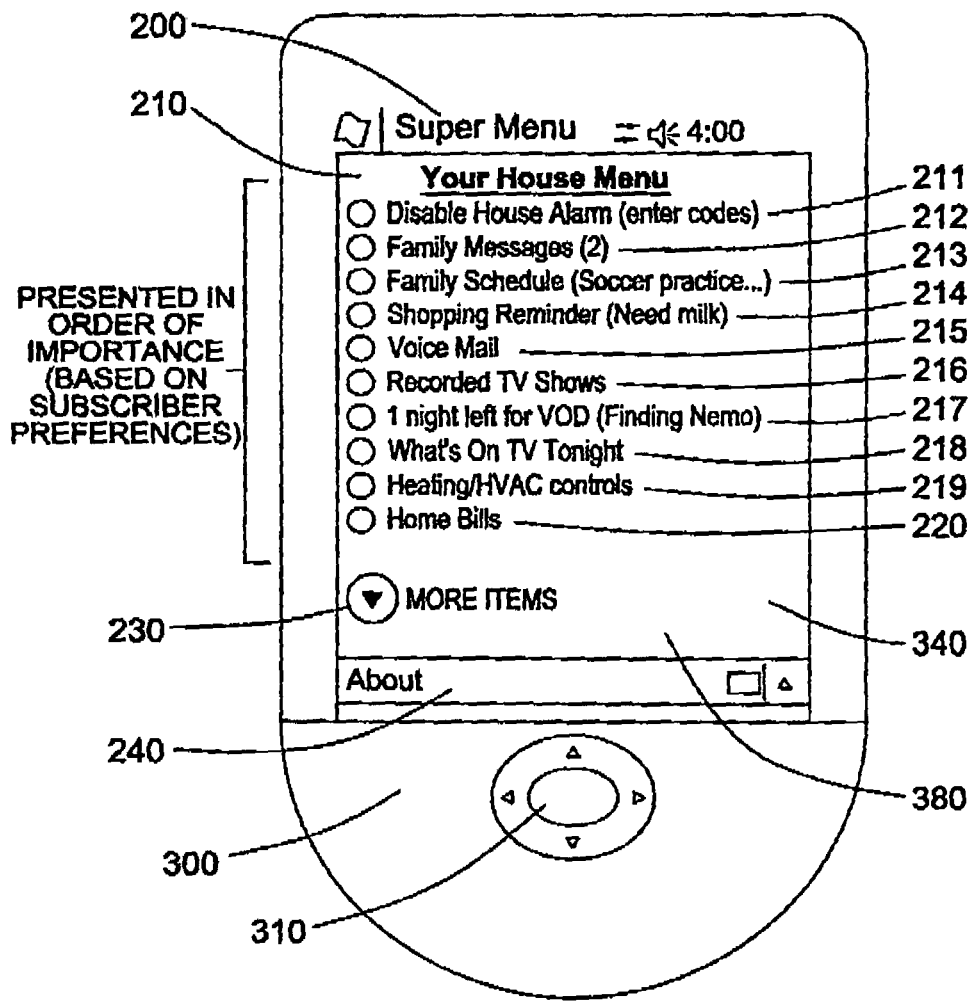
FIG. 3 is a screen capture illustrating a contextual menu for accessing triple play services in accordance with an embodiment of the invention; and, FIG. 4 is a flow chart illustrating operations of modules within the memory of a portable device for accessing triple play services provided through a server over a network to the portable device, in accordance with an embodiment of the invention.

FIG. 3 is a screen capture illustrating a contextual menu 200 for accessing triple play services in accordance with an embodiment of the invention. In FIG. 3, the contextual menu 200 is displayed on a display screen 340 of a data processing system 300 as a part of that system's GUI 380. In this embodiment, the data processing system 300 is a portable device and the input device 310 is in the form of a thumb wheel or track ball. The portable device 300 may communicate through its interface 350 over a wireless network 110 to other local or remote data processing systems 120, 300. A local data processing system 300 (e.g., a PC, set-top box, etc.) may function as a base system for the portable device 300.

The contextual menu 200 provides a list or choice of services 210 that is based on the location of the portable device 300, on the triple play services available at that location, and on the user's preferences. In FIG. 3, the location is the user's home and hence the list 210 ("Your Home Menu") contains triple play services that are currently available from the user's home. The services 211-220 in the list 210 are sorted in order of importance based on the user's preferences. These preferences may be defined through a configuration screen (not shown). The list of services 210 may include the following: a disable house alarm (enter codes) menu item or button 211 for selecting to access the home alarm system for controlling functions such as turning the alarm system on and off; a family messages menu item or button 212 ("2" messages posted) for selecting to access a posting of messages of interest to the user's family; a family schedule menu item or button 213 ("Soccer practice . . . " listed) for selecting to access a listing or calendar of family related activities; a shopping reminder menu item or button 214 ("Need milk") for selecting to access a listing of to-dos such as products to pick-up at the local supermarket; a voice mail menu item or button 215 for selecting to access a wired or wireless telephone service to retrieve voice mail messages; a recorded TV shows menu item or button 216 for selecting access to a television service; a video-on-demand ("VOD") menu item or button 217 ("1 night left for VOD (Finding Nemo)") for selecting access to a VOD service; a TV guide menu item or button 218 ("What's On TV Tonight") for selecting to access a listing of TV programs; a heating/HVAC controls menu item or button 219 for selecting to access the home HVAC system for controlling functions such as adjusting the temperature; and, a home bills menu item or button 220 for selecting to access a posting of outstanding bills received typically via the Internet. Of course, the list of services 210 may include other or more services provided by the SP. These other services may be presented on the display screen (e.g., through a scrolling operation) upon selection of the more items button 230. The list of services 210 shown in FIG. 3 may represent the services to which the user (or subscriber) has subscribed.

By selecting a menu item or button 211-220 from the list of services 210, the user may access the service. If the access is for a configuration or control function, an appropriate message may then be sent from the portable device 300 to the server 120 over the network 110. The messages may consist of one or more IP packets (i.e., for an IP based network) and may include an ID (i.e., a user ID, a data processing system ID, etc.) and a password for the user. Upon receiving the message, the server 120 configures or controls the service in accordance with parameters contained in the message.

According to one embodiment, the portable device 300 includes a global positioning system ("GPS") receiver (not shown) for determining its location. The portable device 300 may determine its location by comparing a GPS value received by the GPS receiver to stored GPS values (i.e., in memory 330) that correspond to the user's home, office, etc. Of course, other means may be used by the portable device 300 to determine its relative location.

According to one embodiment, the portable device 300 determines which triple play services are available at a particular location by referring to a stored table (i.e., in memory 330) listing services versus location. Of course, other means may be used by the portable device 300 to determine available services for a location.

According to one embodiment, the portable device 300 may use a Bluetooth transceiver (not shown) and associated protocol, or other hot zone transceivers and protocols, to determine its relative location and the available services for that location. According to one embodiment, the portable device 300 may receive a message from a local system 120, 300 indicating which services are available from that local system. The local system 120, 300 may broadcast the message periodically or in response to a request from the portable device 300. According to one embodiment, the message may direct the portable device 300 and user to the nearest location (or next location) where a service may be accessed. In this way, the portable device 300 and user may be provided with a number of locations (e.g., forming a path or tour) where the service may be accessed.

According to one embodiment, the portable device 300 determines user service preferences from a stored table (i.e., in the memory 330) listing services versus preference level. A user may change the preference level for a service through a preferences configuration screen (not shown). Of course, other means may be used by the portable device 300 to determine user service preferences.

According to one embodiment, the contextual menu 200 is presented on the display screen 340 of the portable device 300 as the user approaches his home. That is, the content 210 of the contextual menu 200 is updated when the user changes locations. For example, the list 210 shown in FIG. 3 pertains to a location that is the user's home. This list 210 may be displayed when the user is at home or is within a certain distance from his or her home. Only services that are available from the user's home are presented in the list. The order of the services 210 in the list are based on their importance to the user as defined by the user's preferences. For example, the service associated with the disable house alarms menu item or button 211 is of a higher preference level than the service associated with the voice mail menu item or button 215 as it appears earlier in the list of services 210 presented.

According to another embodiment, upon entering a user's car, the user's portable device 300 may update the list of services 210 presented to include the following: a mapping software link menu item; a traffic report link menu item; a preset radio stations menu item; and, a service reminder (i.e., for the car) menu item. These services may be further updated as the car moves from location to location (e.g., from local mall, to local pub, to parking lot, etc.).

According to another embodiment, upon entering the living room of a user's home where the user's television related equipment is located, the user's portable device 300 may update the list of services 210 presented to include television related services. These television related services may include the following: a TV listings menu item with record/remind controls, a search menu item with easy to use controls based on the portable device's input device 310 (e.g., a keypad or keyboard); a video conferencing menu item that allows the user to participate in the video conference using a camera mounted above the television and optionally using the portable device's microphone (for voice input) and speaker (for audio output); and, a photo menu item that allows the user to view digital photographs on the television and which may be linked to the user's PC and home network from which a library of stored digital photographs may be accessed.

According to another embodiment, upon entering a museum or art gallery, the user's portable device 300 may update the list of services 210 presented to include the following: a menu item for accessing the museum's special activities for the day; a menu item for accessing the museum's floor plan; a menu item for providing a guided/virtual tour of the museum with an associated price (if any); and, a menu item for downloading additional information and links with respect to specific exhibit stations or locations within the museum.

According to another embodiment, upon entering the user's workplace, the user's portable device 300 may update the list of services 210 presented to include the following: a menu item for presenting a list of meetings scheduled for the day; a menu item for accessing messages and/deliveries addressed to the user; a menu item for accessing a list of who is available and/or present at work; and, a menu item for synchronizing the portable device 300 with the network at the workplace.

According to another embodiment, upon entering a shopping mall, the user's portable device 300 may update the list of services 210 presented to include the following: a menu item for accessing a "what's new" link for providing recent information or news items; a menu item for accessing a pertinent sales links; a menu item for accessing a floor plan for the mall; a menu item for accessing promotions and/or coupons relating to the mall; and, a menu item for accessing additional information with respect to particular items of interest to the user.

According to another embodiment, upon entering an airport, the user's portable device 300 may update the list of services 210 presented to include the following: a menu item for accessing flight schedules; a menu item for accessing a floor plan for the airport; and, a menu item for accessing available video terminals to allow the user to watch TV or videos while waiting for his or her flight.

According to one embodiment, a user may configure a service (e.g., a television service) using a data processing system (e.g., a portable device 300) other than that on which the service (i.e., the television service) will be provided. In this case, the data processing system on which the service is provided may be referred to as the target system. For example, a parent may log-in to the server 120 using a portable device 300 while at his or her workplace. The parent may then configure controls for television service provided to a television (i.e., the target system) at the parent's home. Thus, the parent may remotely configure controls for television viewed by his or her children using the portable device 300.

The present invention provides several advantages. It provides a contextual menu 200 that acts as an access point for relevant communication services, portable device controls, point of purchase applications, and information presentation. It allows a user to access services and information through a user friendly interface 200 rather than previous systems where a user may struggle to find an appropriate interface for a service. It provides a contextual menu 200 that regroups available menu items based on the user's preferences, location, and the surrounding technology. It provides a contextual menu 200 that orders menu items based on their importance to the user (i.e., the most important menu item 211 is presented at the head of the list of services 210). It allows a user to become aware of services and information that are important to the user based on the user's proximity to corresponding places, things, and other people (i.e., their portable devices). It allows a user to define through preference settings which locations, devices, and people are important to him or her and on this basis control access to corresponding services. And, it allows for a hierarchical menu structure allowing a user to move between menu levels while at a specific location or place. For example, the hierarchical structure may provide sequential menus as a user moves from a city, to a mall within the city, to a store within the mall, and to a department (e.g., the music department) within the store. As another example, sequential menus may be provided as a user arrives at his or her home, moves to the living room within the home, and accesses a television service within the living room. As a further example, sequential menus may be provided as a user moves from a bank, to a street outside the bank, to a bus stop on the street, and onto the bus from the bus stop.

Figure 4:
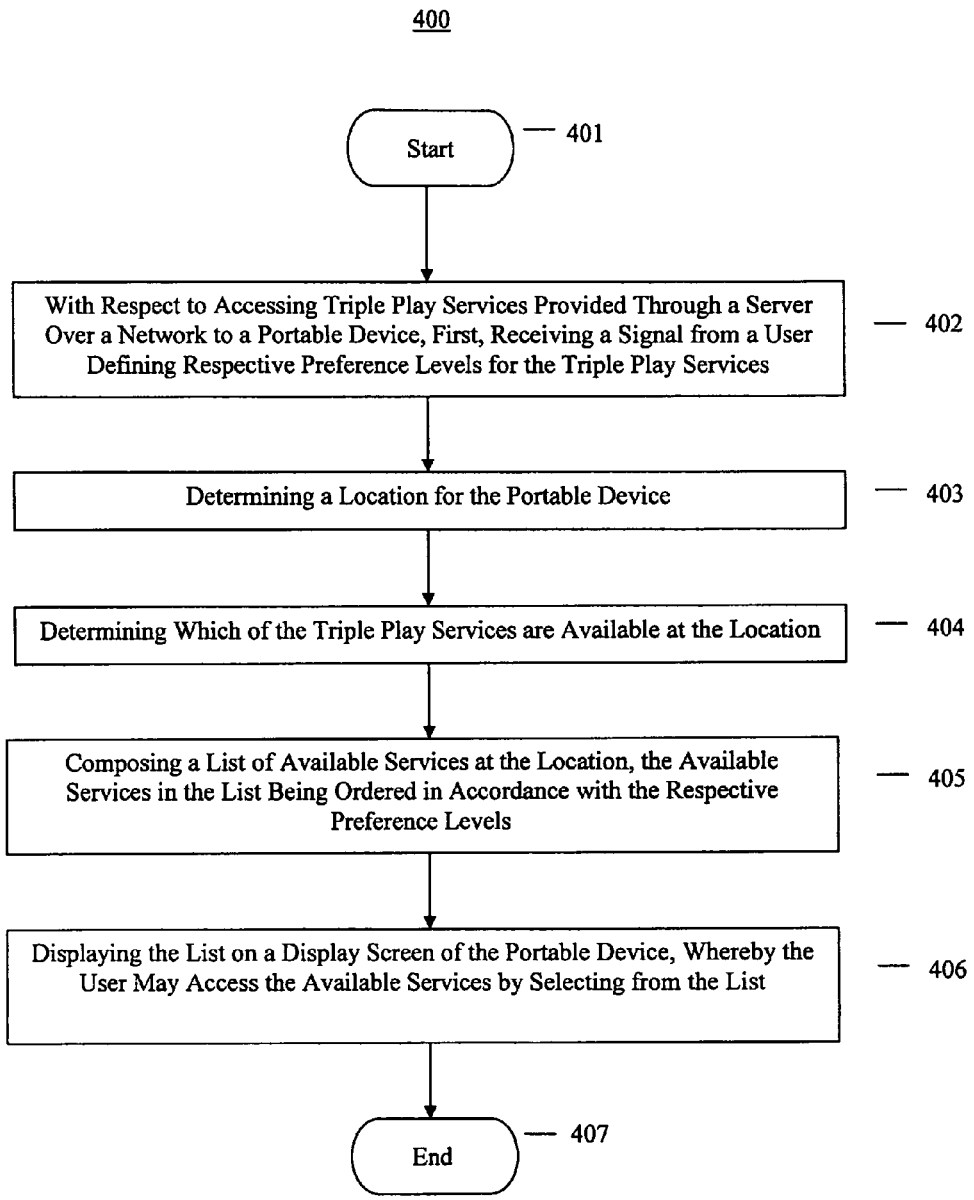

The above described method may be summarized with the aid of a flowchart. FIG. 4 is a flow chart illustrating operations 400 of modules 331 within the memory 330 of a portable device 300 for accessing triple play services provided through a server 120 over a network 110 to the portable device 300, in accordance with an embodiment of the invention.

At step 401, the operations 400 start.

At step 402, a signal is received from a user defining respective preference levels for the triple play services.

At step 403, a location is determined for the portable device 300.

At step 404, a determination is made as to which of the triple play services are available at the location.

At step 405, a list 210 of available services 211-220 at the location is composed, the available services 211-220 in the list 210 being ordered in accordance with the respective preference levels.

At step 406, the list 210 is displayed 200 on a display screen 340 of the portable device 300, whereby the user may access the available services 211-220 by selecting from the list 210.

At step 407, the operations 400 end.

In the above method, the step 403 of determining the location may further include receiving a signal indicative of the location. The signal indicative of the location may be received from a global positioning system ("GPS") receiver within the portable device 300. The step 404 of determining which of the triple play services are available at the location may further include using the location to look up the available services 211-220 from a table of locations and available services. The portable device 300 may be at least one of a wireless device, a cellular telephone, a personal digital assistant, a portable computer, and a remote control unit. The location may be at least one of a home of the user, a workplace of the user, and a location of an automobile of the user. The method may further include the step of determining a next location for the portable device and updating the list 210 in accordance with the next location when the portable device 300 is within a predetermined distance from the next location. The triple play services may be one or more of a television service, a wired telephone service, a cellular telephone service, a wireless data service, a wireless email service, an Internet service, a short message service, a home security system service, a weather forecast service, and an on-line map service. The network 110 may be an Internet Protocol ("IP") based network. And, the server 120 may be an Internet server.

According to one embodiment of the invention, the above described method may be implemented by the server 120 rather than by the portable device 300.

While this invention is primarily discussed as a method, a person of ordinary skill in the art will understand that the apparatus discussed above with reference to a data processing system 300, may be programmed to enable the practice of the method of the invention. Moreover, an article of manufacture for use with a data processing system 300, such as a pre-recorded storage device or other similar computer readable medium including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the data processing system 300 of FIG. 2 can be contained in a data carrier product according to one embodiment of the invention. This data carrier product can be loaded into and run by the data processing system 300 of FIG. 2. In addition, the sequences of instructions which when executed cause the method described herein to be performed by the data processing system 300 of FIG. 2 can be contained in a computer software product according to one embodiment of the invention. This computer software product can be loaded into and run by the data processing system 300 of FIG. 2. Moreover, the sequences of instructions which when executed cause the method described herein to be performed by the data processing system 300 of FIG. 2 can be contained in an integrated circuit product (e.g., hardware modules) including a coprocessor or memory according to one embodiment of the invention. This integrated circuit product can be installed in the data processing system 300 of FIG. 2.

The embodiments of the invention described above are intended to be exemplary only. Those skilled in this art will understand that various modifications of detail may be made to these embodiments, all of which come within the scope of the invention.

What is claimed is:

1. A method of selecting triple play services provided through a server over a network to a portable device, the method comprising:

receiving a signal from a user having user-defined, respective preference levels for the triple play services in the portable device, wherein the user-defined, respective preference levels are defined in context of importance of the triple play services to the user in particular locations without requiring the user to submit information regarding the particular locations and surrounding technology;

determining a current location of the portable device;

determining which of the triple play services are available at the current location;

composing a list of available services at the current location, the available services in the list being ordered in accordance with the user-defined, respective preference levels for the current location and the user's proximity to the available services, wherein the list has a hierarchical menu structure that allows the user to move between menu levels while at the current location, the menu levels arranged as a sequence of physical locations to anticipate future movement of the user; and, displaying the list in an order of preference on a display screen of the portable device, the order of preference reflecting the user-defined, respective preference levels, whereby the user may access the available services by selecting from the list.

2. The method of claim 1, wherein the determining the current location further comprises:

receiving a signal indicative of the current location.

3. The method of claim 1, wherein the portable device is at least one of a wireless device, a cellular telephone, a personal digital assistant, a portable computer, and a remote control unit.

4. The method of claim 1, wherein the current location is at least one of a home of the user, a workplace of the user, and a location of an automobile of the user.

5. The method of claim 1, further comprising:

determining a next location for the portable device; and updating the list in accordance with the next location when the portable device is within a predetermined distance from the next location.

6. The method of claim 1, wherein the triple play services are one or more of a television service, a wired telephone service, a cellular telephone service, a wireless data service, a wireless email service, an Internet service, a short message service, a home security system service, a weather forecast service, and an on-line map service.

7. The method of claim 1, wherein the network is an Internet Protocol ("IP") based network.

8. The method of claim 1, wherein the server is an Internet server.

9. The method of claim 2, further comprising:

receiving the signal indicative of the current location from a global positioning system ("GPS") receiver within the portable device.

10. The method of claim 2, wherein the determining which of the triple play services are available at the location further comprises:

using the current location to look up the available services from a table of locations and available services.

11. A portable device that selects triple play services provided through a server over a network, the portable device comprising:

a processor coupled to memory, a display screen, and an input device; and, modules within the memory and executed by the processor the modules including:

a module that receives a signal from a user having user-defined, respective preference levels for the triple play services in the portable device, wherein the respective preference levels are defined in context of importance of the triple play services to the user in particular locations without requiring the user to submit information regarding the particular locations and surrounding technology;

a module that determines a current location for the portable device;

a module that determines which of the triple play services are available at the current location;

a module that composes a list of available services at the current location, the available services in the list being ordered in accordance with the user-defined, respective preference levels for the current location and the users proximity to the available services, wherein the list has a hierarchical menu structure that allows the user to move between menu levels while at the current location, the menu levels arranged as a sequence of physical locations to anticipate future movement of the user; and, a module that displays the list in an order of preference on the display screen, the order of preference reflecting the user-defined, respective preference levels, whereby the user may access the available services by selecting from the list with the input device.

12. The portable device of claim 11, wherein the module that determines the location further comprises:

a module that receives a signal indicative of the current location.

13. The portable device of claim 11, wherein the portable device is at least one of a wireless device, a cellular telephone, a personal digital assistant, a portable computer, and a remote control unit.

14. The portable device of claim 11, wherein the current location is at least one of a home of the user, a workplace of the user, and a location of an automobile of the user.

15. The portable device of claim 11, further comprising:

a module that determines a next location for the portable device and updates the list in accordance with the next location when the portable device is within a predetermined distance from the next location.

16. The portable device of claim 11, wherein the triple play services are one or more of a television service, a wired telephone service, a cellular telephone service, a wireless data service, a wireless email service, an Internet service, a short message service, a home security system service, a weather forecast service, and an on-line map service.

17. The portable device of claim 11, wherein the network is an Internet Protocol ("IP") based network.

18. The portable device of claim 11, wherein the server is an Internet server.

19. The portable device of claim 12, wherein the signal indicative of the current location is received from a global positioning system ("GPS") receiver within the portable device.

20. The portable device of claim 12, wherein the module that determines which of the triple play services are available at the location further comprises:

a module that uses the current location to look up the available services from a table of locations and available services.

* * * * *